(No Model.) 2 Sheets—Sheet 1.
J. M. MARLIN.
REVOLVER.
No. 367,535. Patented Aug. 2, 1887.
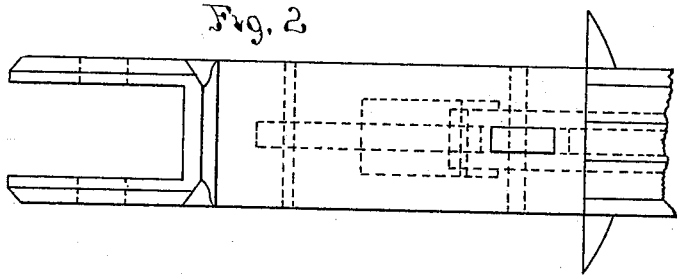
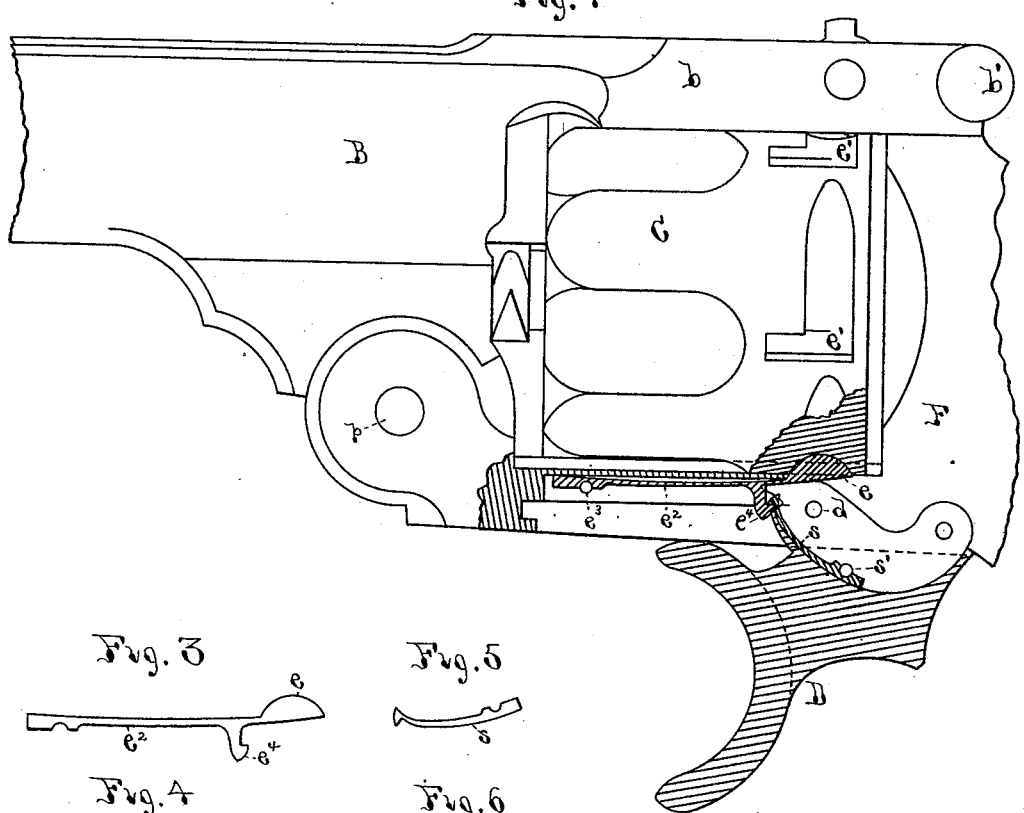
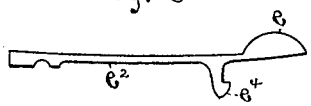 
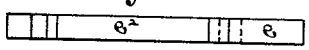 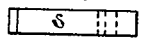
Witnesses
Wm S. Brown
N. P. Ockington
Inventor
John M. Marlin
By David Hall Rice
Atty.

(No Model.) 2 Sheets—Sheet 2.
J. M. MARLIN.
REVOLVER.
No. 367,535. Patented Aug. 2, 1887.
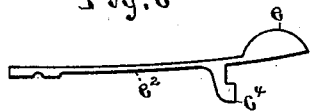
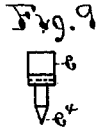
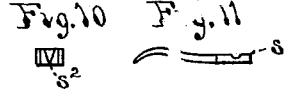
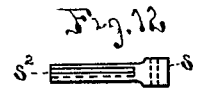
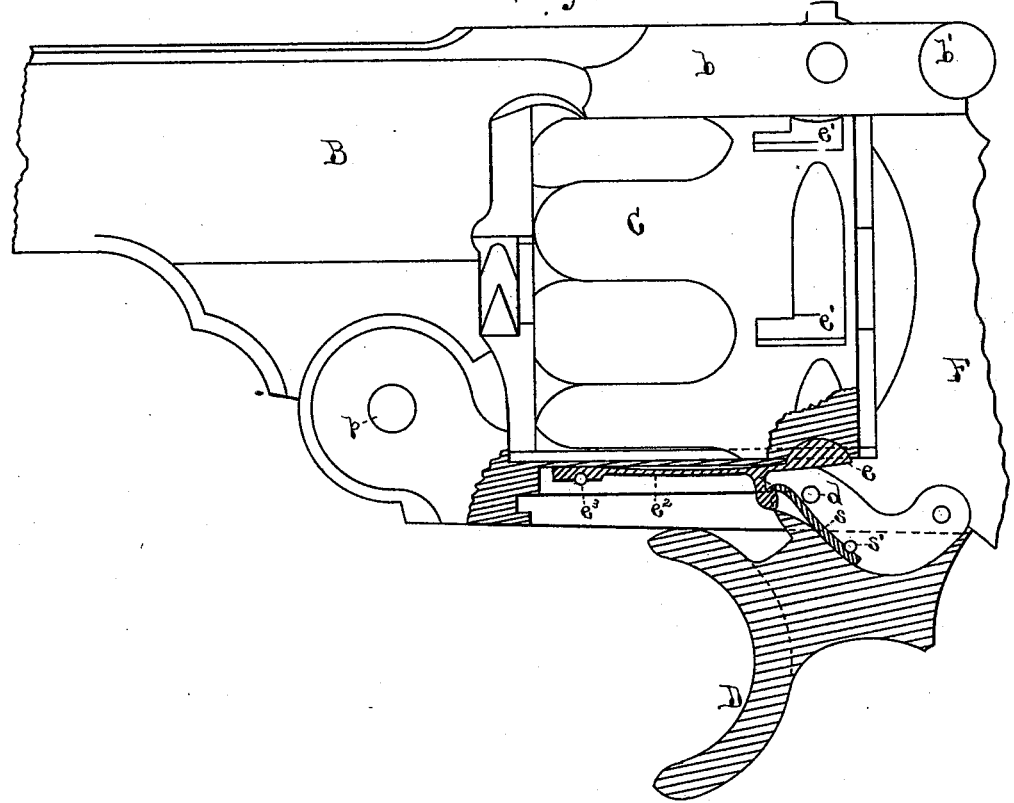
Witnesses
Inventor

UNITED STATES PATENT OFFICE.

JOHN M. MARLIN, OF NEW HAVEN, CONNECTICUT.

REVOLVER.

SPECIFICATION forming part of Letters Patent No. 367,535, dated August 2, 1887.

Application filed April 27, 1887. Serial No. 236,297. (No model.)

*To all whom it may concern:*

Be it known that I, JOHN M. MARLIN, of New Haven, in the county of New Haven and State of Connecticut, have invented certain new and useful Improvements in Revolvers, of which the following is a specification.

My invention relates to revolving fire-arms; and it consists in certain new and useful constructions and combinations of the several parts thereof, substantially as hereinafter described and claimed.

In the drawings, Figure 1 is a side elevation of a portion of a revolving fire-arm, partly in section, constructed according to my invention. Fig. 2 is a view from the lower side of Fig. 1 of a portion of the frame of the arm. Figs. 3, 4, 5, and 6 are detail views of working parts shown in Fig. 1. Fig. 7 is a side elevation similar to Fig. 1, showing a modification of my invention. Figs. 8, 9, 10, 11, and 12 are detail views of working parts shown in Fig. 7.

B is the barrel of the arm, provided with a rearward extension, $b$, above the cylinder C. The cylinder revolves on an axial pin projecting rearwardly from the barrel in the ordinary way.

F is the frame of the arm, extending underneath the cylinder to the pivot $p$, by which it is attached to the lower side of the barrel. The barrel-extension $b$ is locked to the frame F by the latch $b'$. The frame F in the rear of the cylinder contains the usual lock-and-cylinder-actuating mechanism—as, for instance, that shown in the Patent No. 308,183, granted to me November 18, 1884. All these parts are of the ordinary construction, and will be understood without further description.

My present improvement relates to the cylinder-stop mechanism, and is constructed as follows: D is the trigger of the arm, pivoted at $d$ in the frame, and having a slot cut centrally, longitudinally, and vertically downward into its upper edge, as shown at the portion not in section in Fig. 1. The cylinder-stop $e$ moves up and down in this slot in the trigger and engages with the notches $e'$ $e'$ in the cylinder to hold the latter in proper position. Stop $e$ is attached to the end of an elastic arm, $e^2$, which is located in a chamber in the frame F underneath the cylinder, and is held in place by the pin $e^3$. Upon the lower side of arm $e^2$ is a depending hook, $e^4$, attached thereto. In the above-mentioned slot in the trigger D is secured a spring-hook, $s$, by a pin, $s'$, in such a position as to engage with hook $e^4$ when the trigger is thrown forward by its spring, as shown in Fig. 1. When the trigger is drawn backward, its first movement draws down the stop $e$ from the cylinder by the engagement of hooks $e^4$ and $s$, and allows the cylinder to be revolved. The continuing backward movement of the trigger as soon as this is accomplished brings the engaged faces of hooks $e^4$ and $s$ at such an angle to each other that the hook $s$ slips off of $e^4$ and allows the stop $e$ to spring back in time to engage the next notch $e'$ and hold the cylinder in firing position before the trigger has cocked and released before the hammer of the arm. When the arm is fired and trigger released, it is thrown back by its spring to the position shown in Fig. 1, and the hook $s$ springs into engagement with hook $e^4$ by reason of the beveled outer faces of the hooks slipping past each other. It will be noticed that this result is due to the fact that the spring-hook $s$ yields in a direction nearly at right angles to the direction in which the hook $e^4$ on spring-arm $e^2$ yields under pressure.

In Figs. 7, 8, 9, 10, 11, and 12 a modification of the construction above described is shown. The hook $e^4$ is made, as shown in end view of the stop in Fig. 8, wedge-shaped on its lower edge, while the hook $s$ is split vertically and longitudinally through its end which engages with hook $e^4$, the split extending nearly to its other end, as shown in face view in Fig. 12, and being V-shaped on the upper side, as shown in end view in Fig. 10. The spring-hook $s$ is so curved and fixed in the slot of trigger D that it is supported behind by the pivot $d$ of the trigger to prevent its yielding in that direction. When the trigger is pulled backward, hook $s$ draws the stop $e$ from the cylinder and releases it, as before; but when the trigger returns to place, as shown in Fig. 7, the wedge shaped lower edge of hook $e^4$ enters the V-shaped split in hook $s$, and, springing the latter open, passes through, allowing the hooks to resume their position shown in that figure. In this movement it will be observed that the hook $s$ yields substantially at right angles to the movement of stop $e$ and its arm $e^2$.

What I claim as new and of my invention is—

The combination of the cylinder C, provided with notches $e'$ $e'$, the spring-stop $e$, engaging therewith and provided with hook $e^4$, the trigger D, and the spring-hook $s$, attached to and moving therewith, adapted to engage with and unlock itself from the hook $e^4$ upon the backward movement of the trigger, and to spring past the same and engage therewith on the return movement of the trigger, substantially as described.

JOHN M. MARLIN.

Witnesses:
C. F. DEMMER,
J. F. LAWLOR.